(12) United States Patent
Cao et al.

(10) Patent No.: US 12,191,513 B2
(45) Date of Patent: Jan. 7, 2025

(54) BATTERY MODULE

(71) Applicant: CONTEMPORARY AMPEREX TECHNOLOGY (HONG KONG) LIMITED, Hong Kong (CN)

(72) Inventors: Gen Cao, Ningde (CN); Jihua Yao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 913 days.

(21) Appl. No.: 17/316,528

(22) Filed: May 10, 2021

(65) Prior Publication Data
US 2021/0265692 A1 Aug. 26, 2021

Related U.S. Application Data

(63) Continuation of application No. PCT/CN2019/091350, filed on Jun. 14, 2019.

(30) Foreign Application Priority Data

Nov. 22, 2018 (CN) .......................... 201821934967.7

(51) Int. Cl.
*H01M 50/207* (2021.01)
*H01M 50/204* (2021.01)
(Continued)

(52) U.S. Cl.
CPC ....... *H01M 50/242* (2021.01); *H01M 50/204* (2021.01); *H01M 50/207* (2021.01);
(Continued)

(58) Field of Classification Search
CPC ............. H01M 50/207; H01M 50/209; H01M 50/236; H01M 50/238; H01M 50/242; H01M 50/204
See application file for complete search history.

(56) References Cited

U.S. PATENT DOCUMENTS

2012/0141855 A1* 6/2012 Okada ................. H01M 50/276
429/99
2016/0149180 A1 5/2016 Tokoo et al.
(Continued)

FOREIGN PATENT DOCUMENTS

CN 203631621 U 6/2014
CN 106299188 A 1/2017
(Continued)

OTHER PUBLICATIONS

Contemporary Amperex Technology Co., Limited, Extended European Search Report, EP19887806.8, Oct. 29, 2021, 8 pgs.
(Continued)

*Primary Examiner* — Jeremiah R Smith
(74) *Attorney, Agent, or Firm* — Kilpatrick Townsend & Stockton LLP (57) ABSTRACT

This application provides a battery module, including: a plurality of batteries, arranged sequentially along a thickness direction of the battery module; side plates, disposed on two opposite ends of the plurality of batteries in a width direction of the battery module; and a composite pad, disposed between two corresponding adjacent batteries along the thickness direction. The composite pad includes a cushion material sheet and a connecting strip disposed around the cushion material sheet. A first bulge is disposed on the connecting strip. A first via hole is disposed on each side plate. The first via hole corresponds to the first bulge. The first bulge is inserted into the first via hole so that the connecting strip is fixedly connected to the side plate.

15 Claims, 10 Drawing Sheets

(51) Int. Cl.
*H01M 50/209* (2021.01)
*H01M 50/236* (2021.01)
*H01M 50/238* (2021.01)
*H01M 50/242* (2021.01)

(52) U.S. Cl.
CPC ....... *H01M 50/209* (2021.01); *H01M 50/236* (2021.01); *H01M 50/238* (2021.01)

(56) References Cited

U.S. PATENT DOCUMENTS

| | | | |
|---|---|---|---|
| 2018/0123105 A1 | | 5/2018 | Tokoo et al. |
| 2018/0138473 A1* | | 5/2018 | Bessho .................. B60L 50/64 |
| 2018/0138564 A1 | | 5/2018 | Kim et al. |

FOREIGN PATENT DOCUMENTS

| | | | | |
|---|---|---|---|---|
| CN | 207818692 U | * | 9/2018 | |
| CN | 207967119 U | | 10/2018 | |
| EP | 3012884 A1 | | 4/2016 | |
| EP | 3321996 A1 | | 5/2018 | |
| JP | 2018129240 A | | 8/2018 | |
| WO | WO-2014109034 A1 | * | 7/2014 | .......... H01M 10/613 |

OTHER PUBLICATIONS

Contemporary Amperex Technology Co., Limited, International Search Report and Written Opinion, PCTCN2019091350, Sep. 19, 2019, 11 pgs.

\* cited by examiner

FIG. 20

BATTERY MODULE

CROSS-REFERENCE TO RELATED APPLICATIONS

This application is a continuation application of PCT Patent Application No. PCT/CN2019/091350, entitled "BATTERY MODULE" filed on Jun. 14, 2019, which claims priority to Chinese Patent Application No. 201821934967.7, entitled "BATTERY MODULE" filed on Nov. 22, 2018 and entitled "BATTERY MODULE", all of which are incorporated herein by reference in their entirety.

TECHNICAL FIELD

This application relates to the field of secondary batteries, and in particular, to a battery module.

BACKGROUND

In the design of a large battery module and a long battery module currently, in a process of assembling the battery module, two side plates and two end plates work together to fit major faces of a plurality of batteries with each other. The side plates and end plates are welded to fix the plurality of batteries into a battery module. The following problems are very likely to occur in a conventional design scheme: the side plates on both sides of the battery module are stand-alone, and the two side plates and the two end plates are welded to form a battery module frame. The battery module frame is very fragile in a thickness direction of the battery module. During impact and vibration of the battery module, a middle part of the side plates is deformed greatly so that the side plate is separated from the battery.

To solve the problem of separation between the side plate and the battery, a conventional method is to apply thicker side plates to increase rigidity of the side plates. However, this increases the weight and cost of the battery module, and loses competitive advantages. Another method is to apply an adhesive to major faces of the battery. For large-sized batteries currently, flatness of the major faces is difficult to control, and a thickness and an area of the adhesive are hardly appropriate. A too thick adhesive layer affects cycle performance. If the adhesive layer is too thin or the adhesive area is insufficient, strength of the adhesive is not enough, and a high rigidity of the battery module is not ensured.

SUMMARY

In view of the defects in existing technologies, an objective of this application is to provide a battery module to enhance overall rigidity of the battery module and improve capabilities of the battery module in resisting vibration and impact.

To achieve the objective, this application provides a battery module, including: a plurality of batteries, arranged sequentially along a thickness direction of the battery module; side plates, disposed on two opposite ends of the plurality of batteries in a width direction of the battery module; and a composite pad, disposed between two corresponding adjacent batteries along the thickness direction. The composite pad includes a cushion material sheet and a connecting strip disposed around the cushion material sheet. A first bulge is disposed on the connecting strip. A first via hole is disposed on each side plate. The first via hole corresponds to the first bulge. The first bulge is inserted into the first via hole so that the connecting strip is fixedly connected to the side plate.

In an embodiment, each side plate includes a main body and an upper bending portion. The upper bending portion extends from an upper side of the main body toward the plurality of batteries along the width direction. The upper bending portion is located on an upper side of the plurality of batteries in a height direction. The first via hole is disposed on the upper bending portion. The connecting strip includes an upper connecting strip. The upper connecting strip is located on an upper side of the cushion material sheet. The first bulge is formed on the upper connecting strip.

In an embodiment, each side plate includes a main body and a lower bending portion. The lower bending portion extends from a lower side of the main body toward the plurality of batteries along the width direction. The lower bending portion is located on a lower side of the plurality of batteries in a height direction of the battery module. The first via hole is disposed on the lower bending portion. The connecting strip includes a lower connecting strip. The lower connecting strip is located on a lower side of the cushion material sheet. The first bulge is formed on the lower connecting strip.

In an embodiment, each side plate includes a main body. The first via hole is disposed on the main body. The connecting strip includes a lateral connecting strip. The lateral connecting strip is located on a side of the cushion material sheet in the width direction. The first bulge is formed on the lateral connecting strip.

In an embodiment, the connecting strip includes a lower connecting strip. The lower connecting strip is located on a lower side of the cushion material sheet. A second bulge is formed on the lower connecting strip. The battery module further includes a lower plate, disposed and fixed on a lower side of the plurality of batteries in the height direction. A second via hole corresponding to the second bulge is disposed on the lower plate. The second bulge is inserted into the second via hole so that the lower connecting strip is fixedly connected to the lower plate.

In an embodiment, the connecting strip further includes a lower connecting strip. The lower connecting strip is located on a lower side of the cushion material sheet and connected to the lateral connecting strip. A second bulge is formed on the lower connecting strip. The battery module further includes a lower plate, disposed and fixed on a lower side of the plurality of batteries in the height direction. A second via hole corresponding to the second bulge is disposed on the lower plate. The second bulge is inserted into the second via hole so that the lower connecting strip is fixedly connected to the lower plate.

In an embodiment, the connecting strip includes an upper connecting strip. The upper connecting strip is located on an upper side of the cushion material sheet. A third bulge is formed on the upper connecting strip. The battery module further includes a partition plate. The partition plate is located on an upper side of the plurality of batteries in the height direction. A third via hole is disposed on the partition plate. The third bulge is inserted into the third via hole so that the upper connecting strip is fixedly connected to the partition plate.

In an embodiment, the connecting strip further includes an upper connecting strip. The upper connecting strip is located on an upper side of the cushion material sheet and connected to the lateral connecting strip. A third bulge is formed on the upper connecting strip. The battery module further includes a partition plate. The partition plate is located on an upper side of the plurality of batteries in the height direction. A third via hole is disposed on the partition plate. The third bulge is inserted into the third via hole so that the upper connecting strip is fixedly connected to the partition plate.

In an embodiment, the composite pad further includes an overlay film layer, laid on two sides of the cushion material sheet and the connecting strip in the thickness direction, and configured to connect the cushion material sheet and the connecting strip together and expose the first bulge.

In an embodiment, the composite pad further includes an overlay film layer, laid on two sides of the cushion material sheet and the connecting strip in the thickness direction, and configured to connect the cushion material sheet and the connecting strip together and expose the first bulge and the second bulge.

In an embodiment, the composite pad further includes an overlay film layer, laid on two sides of the cushion material sheet and the connecting strip in the thickness direction, and configured to connect the cushion material sheet and the connecting strip together and expose the first bulge and the third bulge.

Beneficial effects of this application are as follows:

In the battery module according to this application, the side plates of the battery module are fixedly connected by the composite pad disposed between two adjacent batteries, so as to enhance overall rigidity of the battery module and improve capabilities of the battery module in resisting vibration and impact.

REFERENCE NUMERALS ARE AS FOLLOWS

1: Battery;
11: Housing;
111: Major face;
112: Minor side face;
12: Top cover;
13: Electrode post
14: Explosion-proof valve
2: Side plate;
21: Main body;
22: Upper bending portion;
23: Lower bending portion;
24: Third bending portion;
3: Composite pad;
31: Cushion material sheet;
32: Connecting strip;
321: Upper connecting strip;
322: Lower connecting strip;
323: Lateral connecting strip;
33: Overlay film layer;
4: Lower plate;
41: Interior duct;
5: Partition plate;
6: End plate;
7: Cushion;
8: Insulation shield;
B1: First bulge;
B2: Second bulge;
B3: Third bulge;
P1: First via hole;
P2: Second via hole;
P3: Third via hole;
T: Thickness direction;
W: Width direction; and
H: Height direction

DETAILED DESCRIPTION OF EMBODIMENTS

The accompanying drawings show embodiments of this application. Understandably, the disclosed embodiments are merely examples of this application, and this application may be implemented in various forms. Therefore, the details disclosed herein are not to be interpreted as limiting, but merely as a basis for the claims and as a representative basis for teaching one skilled in the art to variously employ this application.

Figure 1:
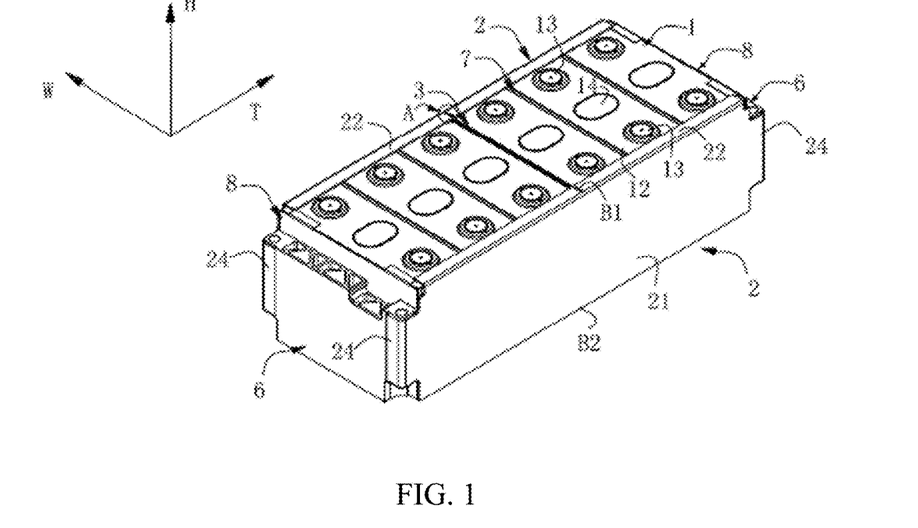
FIG. 1 is a three-dimensional top view of a battery module according to an embodiment of this application.
Figure 2A:
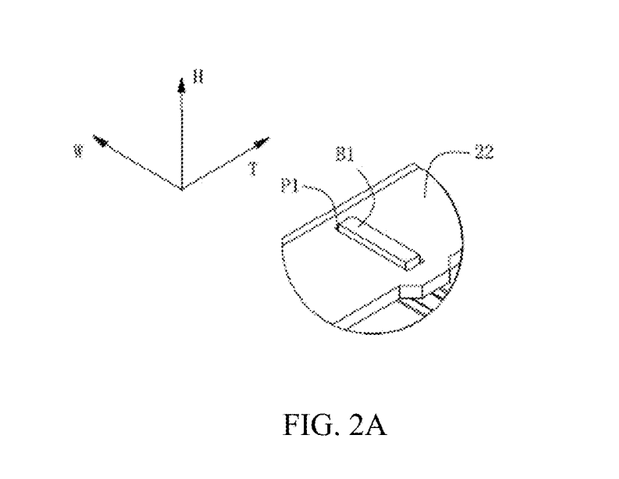
FIG. 2A is a local detailed three-dimensional view of a part A shown in FIG. 1, and shows a manner of fixing a first bulge and a first via hole in an embodiment of a battery module.
Figure 2B:
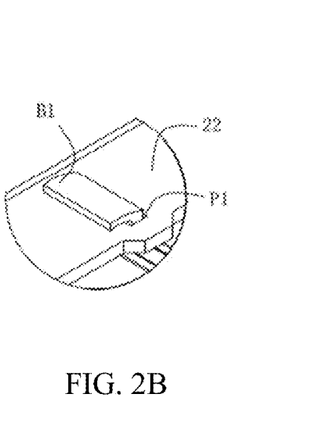
FIG. 2B shows another manner of fixing a first bulge and a first via hole corresponding to FIG. 2A.
Figure 3:
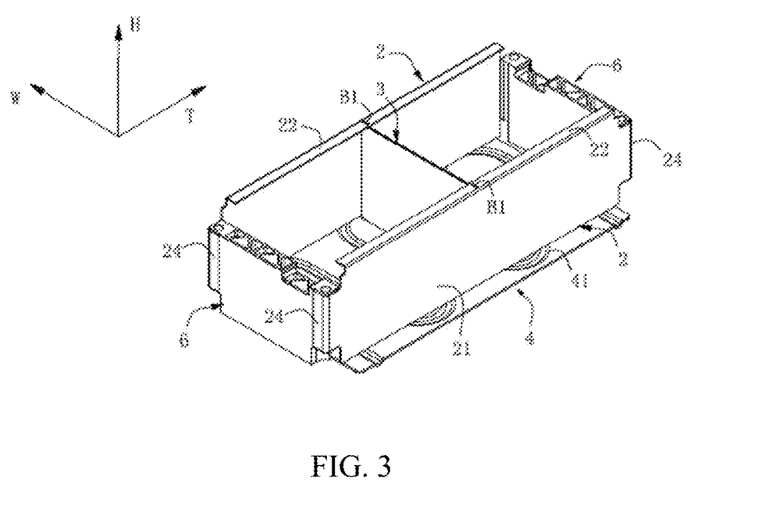
FIG. 3 is another three-dimensional view of the battery module shown in FIG. 1, in which a plurality of batteries and insulation shields are not shown.
Figure 4:
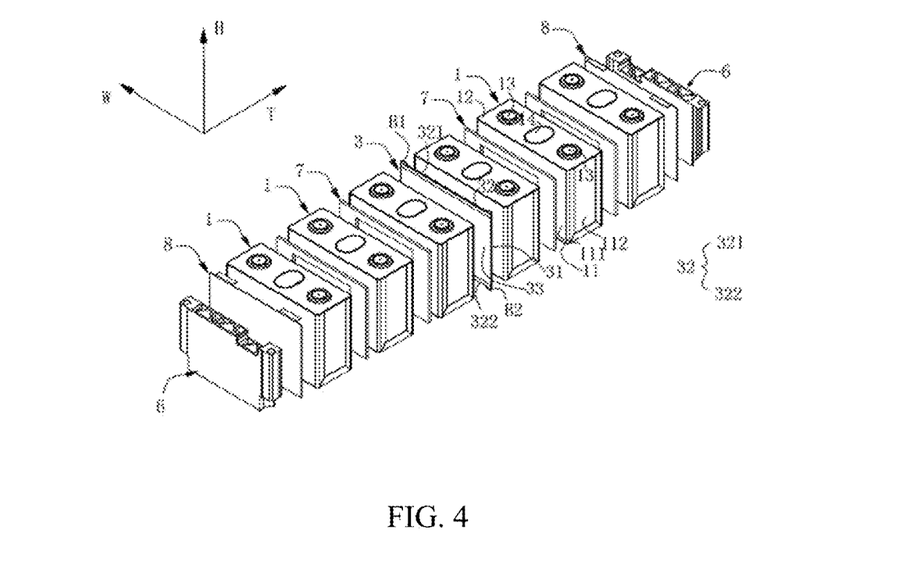
FIG. 4 is another three-dimensional view of the battery module shown in FIG. 1, in which side plates and a lower plate are not shown.
Figure 5:
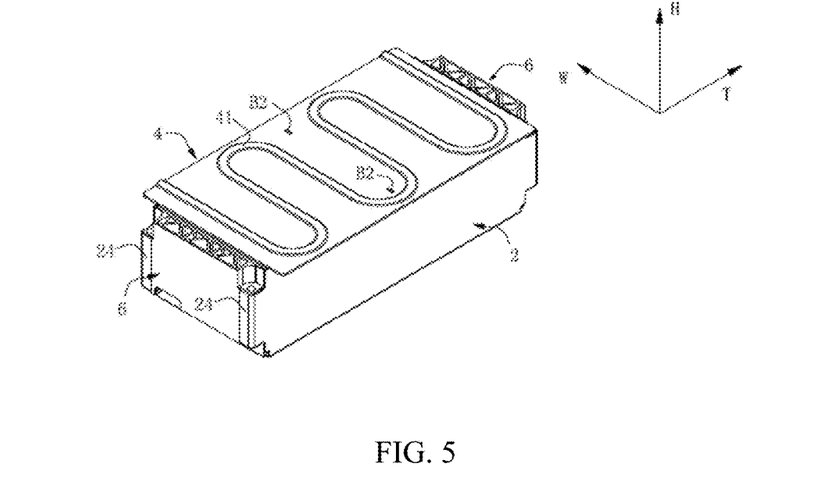
FIG. 5 is a three-dimensional bottom view of the battery module shown in FIG. 1.
Figure 6:
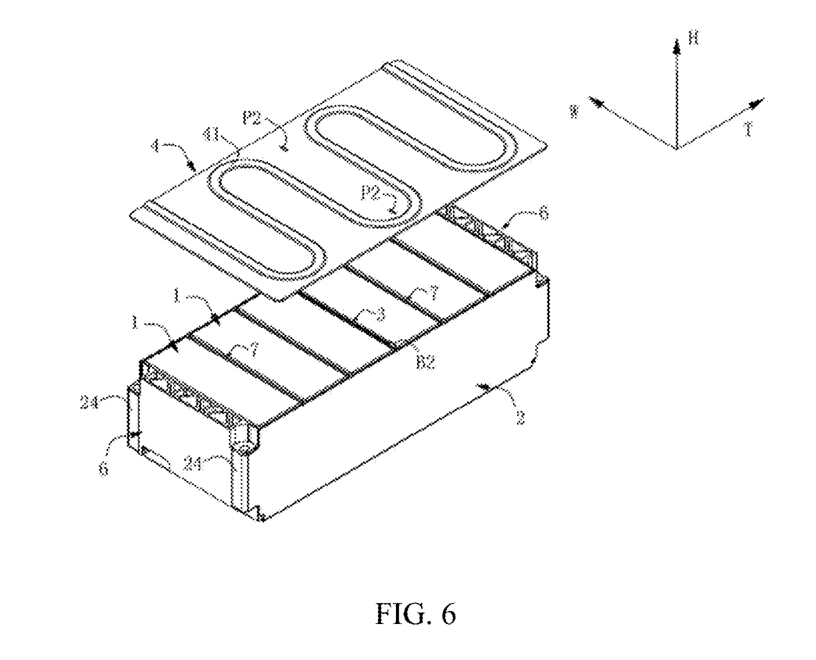
FIG. 6 is a three-dimensional partial exploded view of the battery module shown in FIG. 5.
Figure 7:
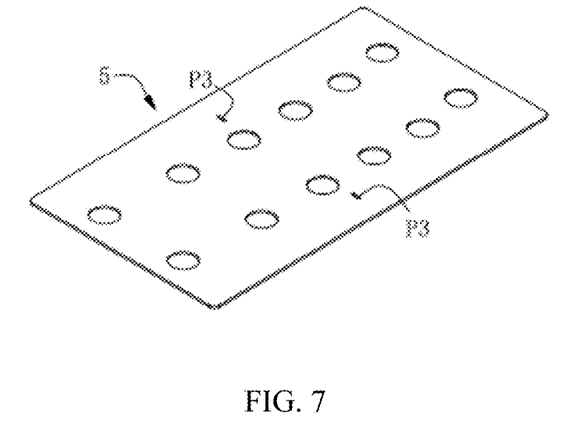
FIG. 7 is a three-dimensional view of a partition plate of a battery module.

FIG. 1 is a three-dimensional top view of a battery module according to an embodiment of this application; FIG. 2A is a local detailed three-dimensional view of a part A shown in FIG. 1, and shows a manner of fixing a first bulge B1 and a first via hole P1 in an embodiment of a battery module; FIG. 2B shows another manner of fixing a first bulge B1 and a first via hole P1 corresponding to FIG. 2A; FIG. 3 is another three-dimensional view of the battery module shown in FIG. 1, in which a plurality of batteries 1 and insulation shields 8 are not shown; FIG. 4 is another three-dimensional view of the battery module shown in FIG. 1, in which side plates 2 and a lower plate 4 are not shown; FIG. 5 is a three-dimensional bottom view of the battery module shown in FIG. 1; FIG. 6 is a three-dimensional partial exploded view of the battery module shown in FIG. 5; and FIG. 7 is a three-dimensional view of a partition plate of a battery module.

The battery module according to this application includes: a plurality of batteries 1, arranged sequentially along a thickness direction T; side plates 2, disposed on two opposite ends of the plurality of batteries 1 in a width direction W; and a composite pad 3, disposed between two corresponding adjacent batteries 1 along the thickness direction T. The battery module further includes: a lower plate 4, disposed and fixed on a lower side of the plurality of batteries 1 in the height direction H; a partition plate 5, located on an upper side of the plurality of batteries 1 in the height direction H; an end plate 6, disposed at either end of the plurality of batteries 1 in the thickness direction T; a cushion 7, disposed between corresponding two adjacent batteries 1 along the thickness direction T; and an insulation shield 8, disposed between the end plate 6 and a battery 1 located at either end of the plurality of batteries 1, and configured to insulate and protect an conductive part (such as main output electrodes (a main positive electrode and a main negative electrode) of the battery module)) in the battery module and corresponding electrical connection parts (such as connectors and wires). An interior duct 41 available for flow of a temperature control medium is disposed in the lower plate 4. The temperature control medium may be added in the interior duct 41 to heat up or cool the battery module.

The battery 1 is a hard-case battery (or called a can-shaped battery), and includes an electrode assembly (not shown), a housing 11, a top cover 12, an electrode post 13, and an explosion-proof valve 14. The housing 11 includes major faces 111 and minor side faces 112. An accommodation cavity is formed inside the housing 11 to accommodate the electrode assembly and an electrolytic solution. The electrode assembly includes a positive electrode plate, a negative electrode plate, and a separator that separates the positive electrode plate from the negative electrode plate. The electrode assembly may be formed by winding the positive electrode plate, the negative electrode plate, and the separator, or by stacking the positive electrode plate, the negative electrode plate, and the separator. The positive electrode plate and the negative electrode plate both include a current collector and an active substance layer disposed on the current collector.

In an example shown in the drawing, a first via hole P1 is disposed on the side plate 2. Specifically, one first via hole P1 is disposed on one side plate 2. The side plate 2 is made of a metal material to improve strength.

In the example shown in the drawing, there is just one composite pad 3 arranged between two adjacent batteries 1 in the middle of the plurality of batteries 1 in the thickness direction T. However, without being limited thereto, the location and quantity of the composite pads 3 may be determined according to actual needs. For example, the composite pad 3 may be plural in number. The plurality of composite pads may be arranged at equal intervals or variable intervals along the thickness direction T to enhance overall rigidity of the battery module.

Each composite pad 3 includes a cushion material sheet 31 and a connecting strip 32 disposed around the cushion material sheet 31. The composite pad 3 may further include an overlay film layer 33. Two first bulges B1 are disposed on the connecting strip 32. The two first bulges B1 correspond to the first via holes P1 of the two side plates 2 respectively. The two first bulges B1 are inserted into the two first via holes P1 respectively so that the connecting strip 32 is fixedly connected to the two side plates 2. In addition, a second bulge B2 and/or a third bulge B3 described later may be further disposed on the connecting strip 32, which will be described in detail later. The overlay film layer 33 is laid on two sides of the cushion material sheet 31 and the connecting strip 32 in the thickness direction T, and configured to connect the cushion material sheet 31 and the connecting strip 32 together (for example, by heat bonding) and expose any bulge (for example, the first bulge B1, the second bulge B2, and the third bulge B3 described later), so as to enhance the overall strength of the composite pad 3.

A disposition manner of the connecting strip 32 of each composite pad 3 varies depending on the structure of the side plate 2.

Figure 8:
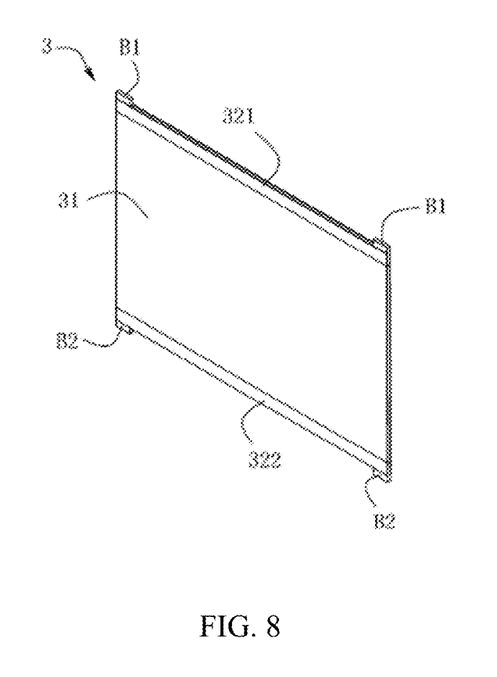
FIG. 8 is a three-dimensional view of a composite pad of the battery module shown in FIG. 1 according to an embodiment.
Figure 9:
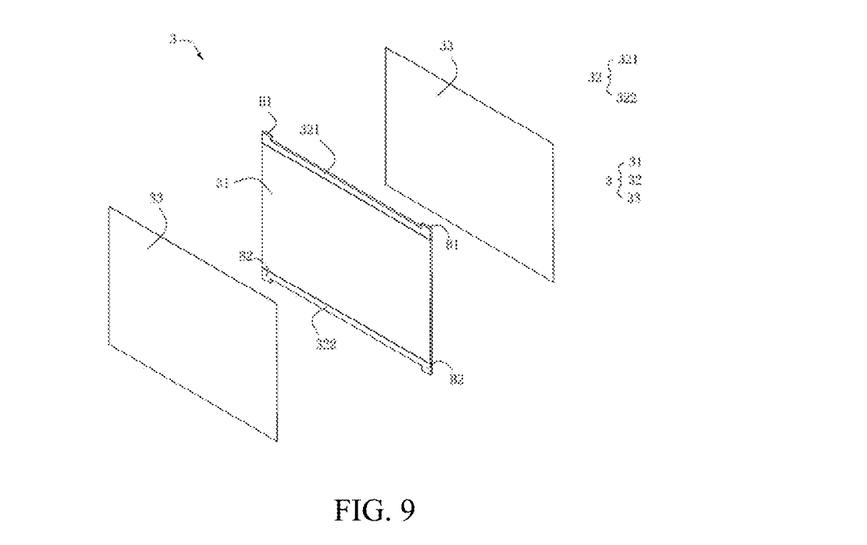
FIG. 9 is a three-dimensional exploded view of a composite pad of a battery module shown in FIG. 8.
Figure 10:
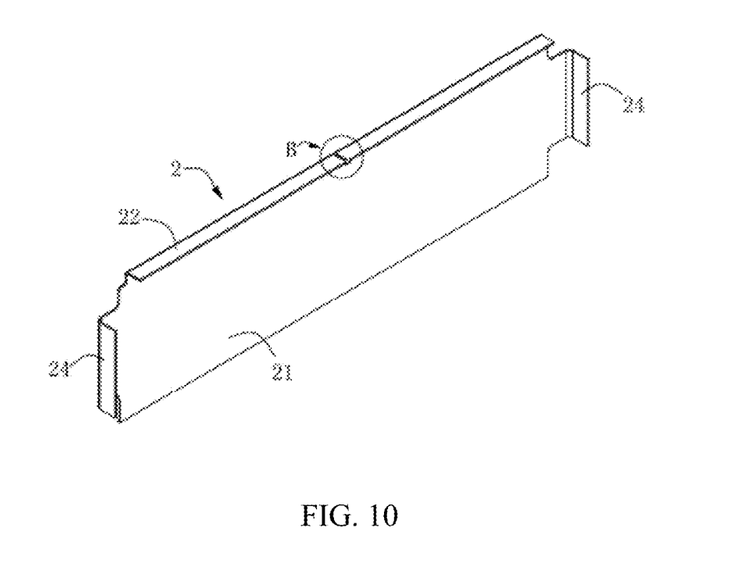
FIG. 10 is a three-dimensional view of side plates of the battery module shown in FIG. 1 according to an embodiment.
Figure 11:
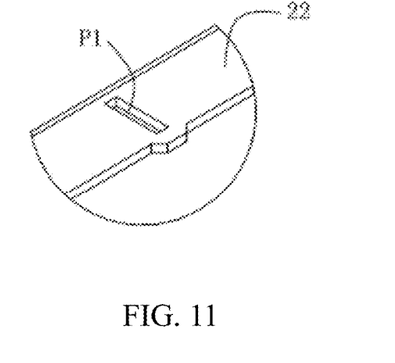
FIG. 11 is a local detailed three-dimensional view of a part B shown in FIG. 10.

FIG. 8 is a three-dimensional view of a composite pad of the battery module shown in FIG. 1 according to an embodiment; FIG. 9 is a three-dimensional exploded view of a composite pad of a battery module shown in FIG. 8; FIG. 10 is a three-dimensional view of side plates of the battery module shown in FIG. 1 according to an embodiment; and FIG. 11 is a local detailed three-dimensional view of a part B shown in FIG. 10.

In the embodiments shown in FIG. 8 to FIG. 11, each side plate 2 includes a main body 21 and an upper bending portion 22. The upper bending portion 22 extends from an upper side of the main body 21 toward the plurality of batteries 1 along the width direction W. The upper bending portion 22 is located on an upper side of the plurality of batteries 1 in a height direction H. The first via hole P1 is disposed on the upper bending portion 22. The connecting strip 32 includes an upper connecting strip 321. The upper connecting strip 321 is located on an upper side of the cushion material sheet 31. The two first bulges B1 are formed on the upper connecting strip 321.

Figure 12:
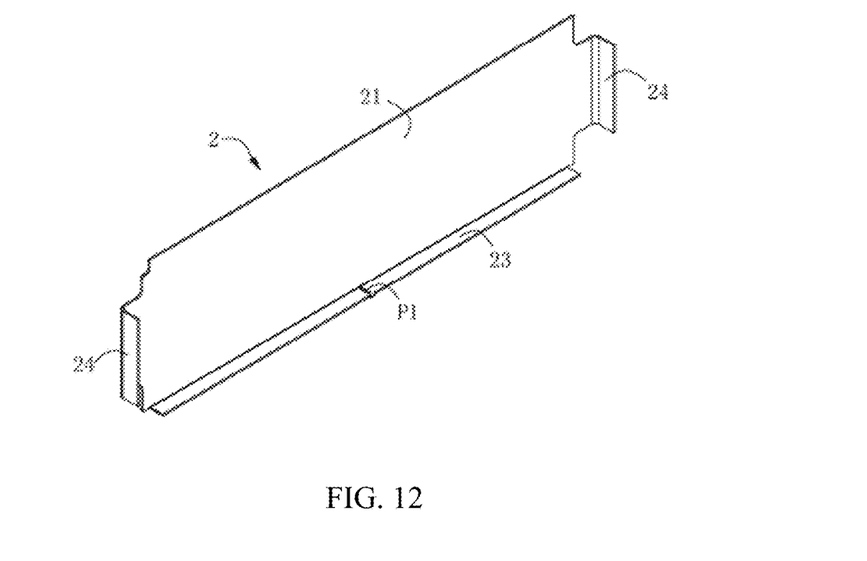
FIG. 12 is a three-dimensional view of side plates of a battery module according to another embodiment.
Figure 13:
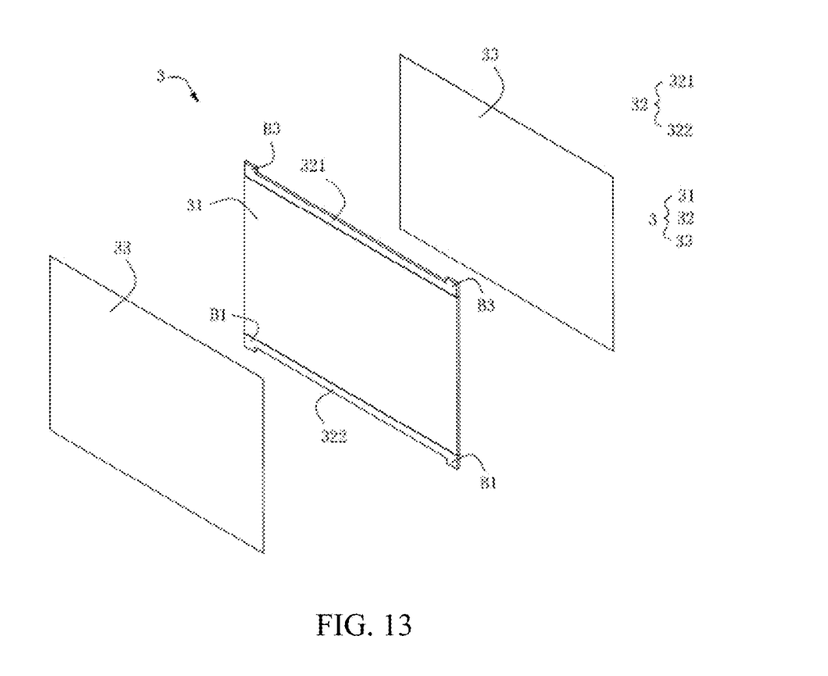
FIG. 13 is a three-dimensional exploded view of a composite pad of a battery module according to another embodiment.

FIG. 12 is a three-dimensional view of side plates of a battery module according to another embodiment; and FIG. 13 is a three-dimensional exploded view of a composite pad of a battery module according to another embodiment.

In the embodiments shown in FIG. 12 and FIG. 13, each side plate 2 includes a main body 21 and a lower bending portion 23. The lower bending portion 23 extends from a lower side of the main body 21 toward the plurality of batteries 1 along the width direction W. The lower bending portion 23 is located on a lower side of the plurality of batteries 1 in the height direction H. The first via hole P1 is disposed on the lower bending portion 23. The connecting strip 32 includes a lower connecting strip 322. The lower connecting strip 322 is located on a lower side of the cushion material sheet 31. The two first bulges B1 are formed on the lower connecting strip 322.

Figure 14:
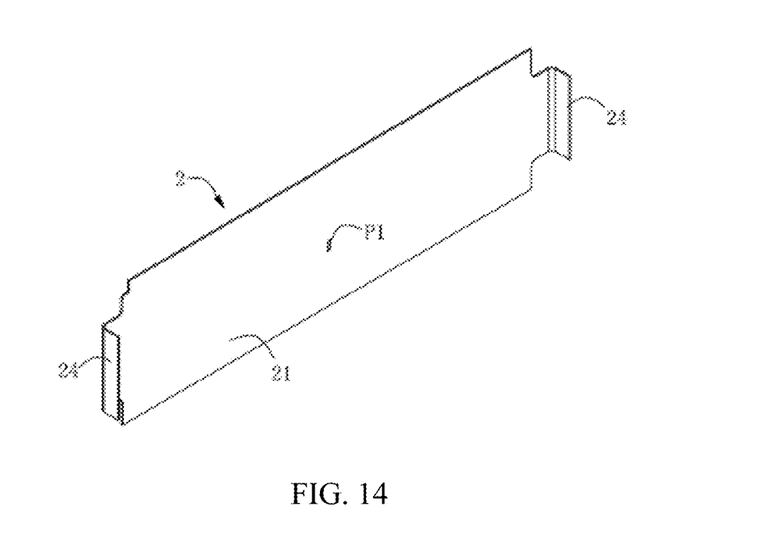
FIG. 14 is a three-dimensional view of side plates of a battery module according to still another embodiment.
Figure 15:
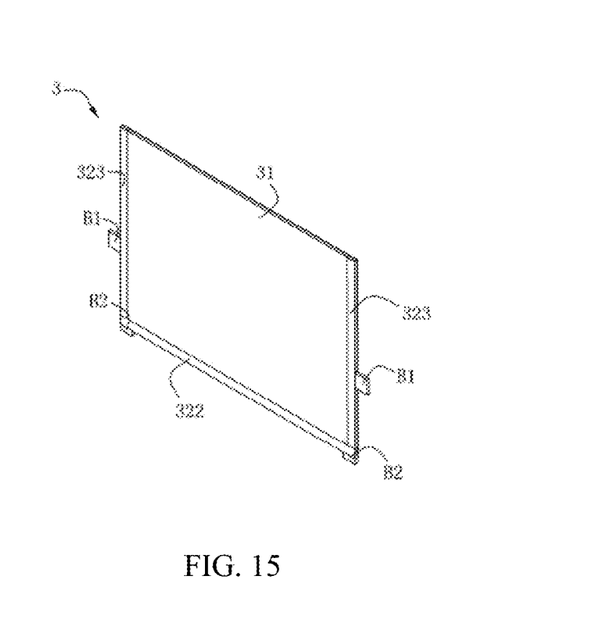
FIG. 15 is a three-dimensional view of a composite pad of a battery module according to still another embodiment.

FIG. 14 is a three-dimensional view of side plates of a battery module according to still another embodiment; FIG. 15 is a three-dimensional view of a composite pad of a battery module according to still another embodiment; and FIG. 16 is a three-dimensional exploded view of a composite pad shown in FIG. 15.

Figure 16:
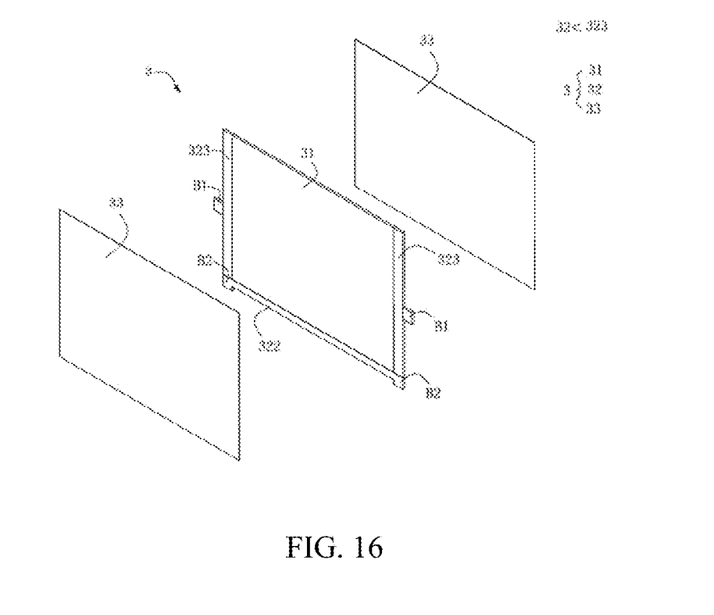
FIG. 16 is a three-dimensional exploded view of a composite pad shown in FIG. 15.

In the embodiments shown in FIG. 14 to FIG. 16, each side plate 2 includes a main body 21. The first via hole P1 is disposed on the main body 21. The connecting strip 32 includes two lateral connecting strips 323. Each lateral connecting strip 323 is located on a side of the cushion material sheet 31 in the width direction W. The two first bulge B1 are formed on the two lateral connecting strips 323 respectively.

More than that the disposition manner of the connecting strip 32 of each composite pad 3 varies with the structure of the side plate 2, the disposition manner of the connecting strip 32 of each composite pad 3 also varies with existence of the lower plate 4. In other words, the structure of the side plate 2 and the disposition manner of the connecting strip 32 of each composite pad 3 adaptively vary depending on whether the lower plate 4 is configured.

Specifically, in a manner, when the lower plate 4 is configured, the lower plate 4 adopts the structure shown in FIG. 6, that is, a second via hole P2 is disposed on the lower plate 4. The side plate 2 adopts the structure shown in FIG. 10, that is, the side plate 2 includes a main body 21 and an upper bending portion 22. The upper bending portion 22 extends from the upper side of the main body 21 toward the plurality of batteries 1 along the width direction W. The upper bending portion 22 is located on the upper side of the plurality of batteries 1 in the height direction H. The first via hole P1 is disposed on the upper bending portion 22. Each composite pad 3 adopts the structure shown in FIG. 8 and FIG. 9, that is, the connecting strip 32 of each composite pad 3 includes an upper connecting strip 321 and a lower connecting strip 322. The upper connecting strip 321 is located on the upper side of the cushion material sheet 31. The two first bulges B1 are formed on the upper connecting strip 321. The lower connecting strip 322 is located on the lower side of the cushion material sheet 31. The second bulge B2 is formed on the lower connecting strip 322. The second bulge B2 is inserted into the second via hole P2 so that the lower connecting strip 322 is fixedly connected to the lower plate 4. As mentioned above, the two first bulges B1 of the connecting strip 32 are inserted into the first via holes P1 of the two side plates 2 so that the connecting strip 32 is fixedly connected to the two side plates 2.

Other than the foregoing manner in which the lower plate 4 is configured, a different manner may be applied.

Specifically, when the lower plate 4 is configured, the lower plate 4 adopts the structure shown in FIG. 6, that is, a second via hole P2 is disposed on the lower plate 4. The side plate 2 adopts the structure shown in FIG. 14, that is, the side plate 2 includes a main body 21. The first via hole P1 is disposed on the main body 21. Each composite pad 3 adopts the structure shown in FIG. 15 and FIG. 16, that is, the connecting strip 32 of each composite pad 3 includes two lateral connecting strips 323 and a lower connecting strip 322. Each lateral connecting strip 323 is located on a side of the cushion material sheet 31 in the width direction W. The two first bulges B1 are formed on the two lateral connecting strips 323 respectively. The lower connecting strip 322 is located on the lower side of the cushion material sheet 31 and connected between the two lateral connecting strips 323. The second bulge B2 is formed on the lower connecting strip 322. The second bulge B2 is inserted into the second via hole P2 so that the lower connecting strip 322 is fixedly connected to the lower plate 4. As mentioned above, the two first bulges B1 of the connecting strip 32 are inserted into the first via holes P1 of the two side plates 2 so that the connecting strip 32 is fixedly connected to the two side plates 2.

Based on the foregoing two connection manners of the lower plate 4, the side plate 2, and each composite pad 3, the two first bulges B1 of the connecting strip 32 are inserted into and fixedly connected to the first via holes P1 of the two side plates 2, and the second bulge B2 of the lower connecting strip 322 is inserted into and fixedly connected to the second via hole P2 on the lower plate 4. In this way, the lower plate 4, the side plate 2, and each composite pad 3 are connected together, and the overall rigidity of the battery module is further enhanced.

Likewise, more than that the disposition manner of the connecting strip 32 of each composite pad 3 varies with the structure of the side plate 2, the disposition manner of the connecting strip 32 of each composite pad 3 also varies with existence of the partition plate 5. In other words, the structure of the side plate 2 and the disposition manner of the connecting strip 32 of each composite pad 3 adaptively vary depending on whether the partition plate 5 is configured.

Specifically, in a manner, when the partition plate 5 is configured, the partition plate 5 adopts the structure shown in FIG. 7, that is, a third via hole P3 is disposed on the partition plate 5. The side plate 2 adopts the structure shown in FIG. 12, that is, the side plate 2 includes a main body 21 and a lower bending portion 23. The lower bending portion 23 extends from the lower side of the main body 21 toward the plurality of batteries 1 along the width direction W. The lower bending portion 23 is located on the lower side of the plurality of batteries 1 in the height direction H. The first via hole P1 is disposed on the lower bending portion 23. Each composite pad 3 adopts the structure shown in FIG. 13 and FIG. 14, that is, the connecting strip 32 of each composite pad 3 includes an upper connecting strip 321 and a lower connecting strip 322. The lower connecting strip 322 is located on the lower side of the cushion material sheet 31. The two first bulges B1 are formed on the lower connecting strip 322. The upper connecting strip 321 is located on the upper side of the cushion material sheet 31. The third bulge B3 is formed on the upper connecting strip 321. The third bulge B3 is inserted into the third via hole P3 so that the upper connecting strip 321 is fixedly connected to the partition plate 5. The two first bulges B1 of the connecting strip 32 are inserted into the first via holes P1 of the two side plates 2 so that the connecting strip 32 is fixedly connected to the two side plates 2.

Other than the foregoing manner in which the partition plate 5 is configured, a different manner may be applied.

Figure 17:
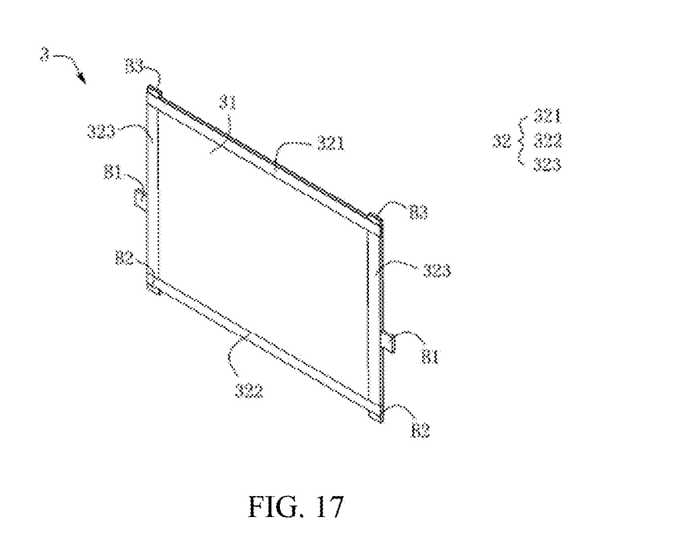
FIG. 17 is a three-dimensional view of a composite pad of a battery module according to yet another embodiment.
Figure 18:
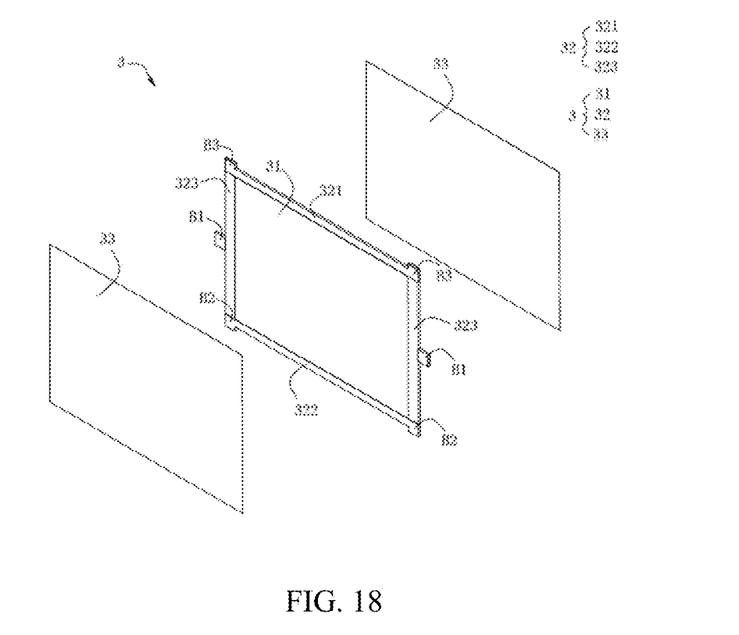
FIG. 18 is a three-dimensional exploded view of a composite pad shown in FIG. 17.

FIG. 17 is a three-dimensional view of a composite pad of the battery module shown in FIG. 1 according to still another embodiment; and FIG. 18 is a three-dimensional exploded view of a composite pad shown in FIG. 17.

When the partition plate 5 is configured, the partition plate 5 adopts the structure shown in FIG. 7, that is, a third via hole P3 is disposed on the partition plate 5. The side plate 2 adopts the structure shown in FIG. 14, that is, the side plate 2 includes a main body 21. The first via hole P1 is disposed on the main body 21. Each composite pad 3 adopts the structure shown in FIG. 17 and FIG. 18, that is, the connecting strip 32 of each composite pad 3 includes two lateral connecting strips 323 and an upper connecting strip 321. Each lateral connecting strip 323 is located on a side of the cushion material sheet 31 in the width direction W. The two first bulges B1 are formed on the two lateral connecting strips 323 respectively. The upper connecting strip 321 is located on the upper side of the cushion material sheet 31 and connected between the two lateral connecting strips 323. The third bulge B3 is formed on the upper connecting strip 321. The third bulge B3 is inserted into the third via hole P3 so that the upper connecting strip 321 is fixedly connected to the partition plate 5. The two first bulges B1 of the connecting strip 32 are inserted into the first via holes P1 of the two side plates 2 so that the connecting strip 32 is fixedly connected to the two side plates 2.

In the foregoing two manners, the two first bulges B1 of the connecting strip 32 are inserted into and fixedly connected to the first via holes P1 of the two side plates 2, and the third bulge B3 of the upper connecting strip 321 is inserted into and fixedly connected to the third via hole P3 on the partition plate 5. In this way, the partition plate 5, the side plate 2, and each composite pad 3 are connected together, and the overall rigidity of the battery module is further enhanced.

Likewise, more than that the disposition manner of the connecting strip 32 of each composite pad 3 varies with the structure of the side plate 2, the disposition manner of the connecting strip 32 of each composite pad 3 also varies with coexistence of the lower plate 4 and the partition plate 5. In other words, the structure of the side plate 2 and the disposition manner of the connecting strip 32 of each composite pad 3 adaptively vary depending on whether the lower plate 4 and the partition plate 5 are configured.

Specifically, in a manner, when both the lower plate 4 and the partition plate 5 are configured, the lower plate 4 adopts the structure shown in FIG. 6, that is, a second via hole P2 is disposed on the lower plate 4. The partition plate 5 adopts the structure shown in FIG. 7, that is, a third via hole P3 is disposed on the partition plate 5. The side plate 2 adopts the structure shown in FIG. 14, that is, the side plate 2 includes a main body 21, and the first via hole P1 is disposed on the main body 21. Each composite pad 3 adopts the structure shown in FIG. 17 and FIG. 18, that is, the connecting strip 32 of each composite pad 3 may include two lateral connecting strips 323, an upper connecting strip 321, and a lower connecting strip 322. Each lateral connecting strip 323 is located on a side of the cushion material sheet 31 in the width direction W. The two first bulges B1 are formed on the two lateral connecting strips 323 respectively. The lower connecting strip 322 is located on the lower side of the cushion material sheet 31 and connected between the two lateral connecting strips 323. The second bulge B2 is formed on the lower connecting strip 322. The upper connecting strip 321 is located on the upper side of the cushion material sheet 31 and connected between the two lateral connecting strips 323. The third bulge B3 is formed on the upper connecting strip 321. The two first bulges B1 are inserted into the two first via holes P1 respectively so that the connecting strip 32 is fixedly connected to the two side plates 2. The second bulge B2 is inserted into the second via hole P2 so that the lower connecting strip 322 is fixedly connected to the lower plate 4. The third bulge B3 is inserted into the third via hole P3 so that the upper connecting strip 321 is fixedly connected to the partition plate 5. In this way, the two side plates 2, the lower plate 4, and the partition plate 5 are connected together, and the overall rigidity of the battery module is further enhanced.

Other than the foregoing manner in which the lower plate 4 and the partition plate 5 are configured, a different manner may be applied.

Figure 19:
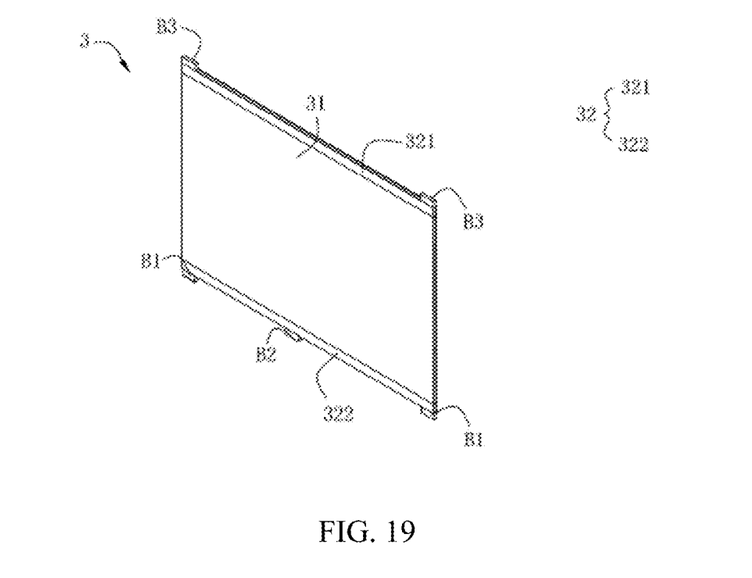
FIG. 19 is a three-dimensional view of a composite pad of a battery module according to yet another embodiment.
Figure 20:
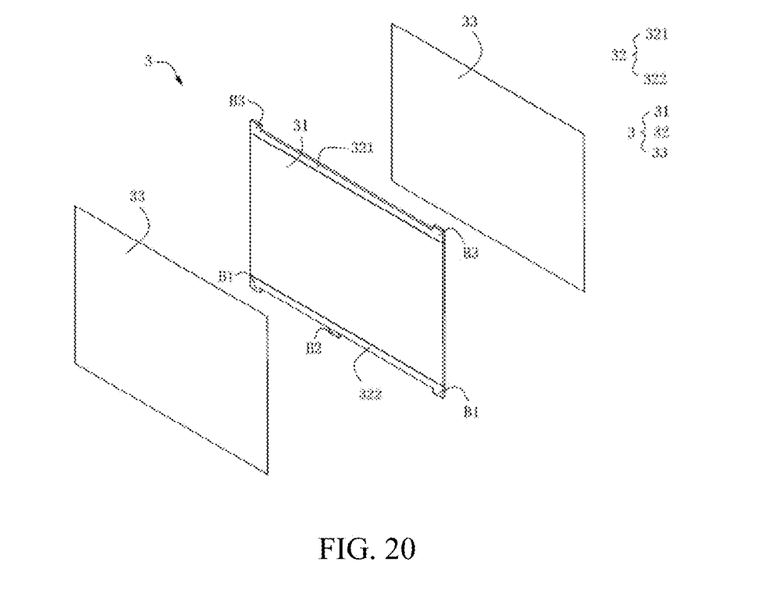
FIG. 20 is a three-dimensional exploded view of a composite pad shown in FIG. 19.

FIG. 19 is a three-dimensional view of a composite pad of the battery module shown in FIG. 1 according to still another embodiment; and FIG. 20 is a three-dimensional exploded view of a composite pad shown in FIG. 19.

Specifically, in another manner, when both the lower plate 4 and the partition plate 5 are configured for the battery module, the lower plate 4 adopts the structure shown in FIG. 6, that is, a second via hole P2 is disposed on the lower plate 4. The partition plate 5 adopts the structure shown in FIG. 7, that is, a third via hole P3 is disposed on the partition plate 5. The side plate 2 adopts the structure shown in FIG. 12, that is, the side plate 2 includes a main body 21 and a lower bending portion 23. The lower bending portion 23 extends from the lower side of the main body 21 toward the plurality of batteries 1 along the width direction W. The lower bending portion 23 is located on the lower side of the plurality of batteries 1 in the height direction H. The first via hole P1 is disposed on the lower bending portion 23. Each composite pad 3 adopts the structure shown in FIG. 19 and FIG. 20, that is, the connecting strip 32 of each composite pad 3 includes an upper connecting strip 321 and a lower connecting strip 322. The upper connecting strip 321 is located on the upper side of the cushion material sheet 31, and the lower connecting strip 322 is located on the lower side of the cushion material sheet 31. The two first bulges B1 are formed on the lower connecting strip 322. The second bulge B2 is formed on the lower connecting strip 322, and the third bulge B3 is formed on the upper connecting strip 321. The two first bulges B1 are inserted into the two first via holes P1 respectively so that the connecting strip 32 is fixedly connected to the two side plates 2. The second bulge B2 is inserted into the second via hole P2 so that the lower connecting strip 322 is fixedly connected to the lower plate 4. The third bulge B3 is inserted into the third via hole P3 so that the upper connecting strip 321 is fixedly connected to the partition plate 5. In this way, the two side plates 2, the lower plate 4, and the partition plate 5 are connected together, and the overall rigidity of the battery module is further enhanced.

In the foregoing embodiments, the first bulge B1 may be fixed in the first via hole P1 by welding. Specifically, referring to the manner of fixing the first bulge B1 to the first via hole P1 shown in FIG. 2A, a pad ring (not shown) may be disposed between the first bulge B1 and the corresponding first via hole P1. After being melted by a high temperature, the pad ring fixes the first bulge B1 into the first via hole P1. Alternatively, referring to the manner of fixing the first bulge B1 to the first via hole P1 shown in FIG. 2B. The first bulge B1 is fixed in the first via hole P1 by being inserted into the first via hole P1 and being welded in an everted way. To ensure reliable fixing between the first bulge B1 and the first via hole P1, a sealing ring (not shown) is disposed between the first bulge B1 and the first via hole P1.

The manner of fixing between the second bulge B2 and the second via hole P2 is identical to that between the first bulge B1 and the first via hole P1. The second bulge B2 may be fixed in the second via hole P2 by welding. Specifically, a pad ring (not shown) may be disposed between the second bulge B2 and the second via hole P2. After being melted by a high temperature, the pad ring fixes the second bulge B2 into the second via hole P2. The second bulge B2 may also be fixed in the second via hole P2 by being inserted into the second via hole P2 and being welded in an everted way. To ensure reliable fixing between the second bulge B2 and the second via hole P2, a sealing ring is disposed between the second bulge B2 and the second via hole P2.

The third bulge B3 may be fixed in the third via hole P3 by hot-melting the partition plate 5 at the third via hole P3. Specifically, the third bulge B3 is fixed in the second via hole P2 by being inserted into the third via hole P3 and being turned outward.

Two ends of the main body 21 of each side plate 2 in the thickness direction T are fixed to the corresponding two ends of the two end plates 6 in the width direction W by welding.

Further, as shown in FIG. 1, FIG. 3, FIG. 5, and FIG. 6, each side plate 2 may further include two third bending portions 24 extending from the two ends of the main body 21 in the thickness direction T toward the plurality of batteries 1 along the width direction W respectively. Each third bending portion 24 of each side plate 2 is fixed to an end of the corresponding end plate 6 in the width direction W by welding, so as to strengthen the overall rigidity of the battery module frame that includes the side plates 2 and the end plates 6.

In conclusion, in the battery module according to this application, the side plates 2 of the battery module are fixedly connected by the composite pad 3 disposed between two adjacent batteries 1, so as to enhance the overall rigidity of the battery module and improve the capabilities of the battery module in resisting vibration and impact.

Although a plurality of exemplary embodiments are described above, this disclosure is not limited to the explicitly disclosed combinations. Therefore, unless otherwise specified herein, the features disclosed herein may be combined together variously. For brevity, other combinations are not described herein.

The foregoing descriptions are merely exemplary embodiments of this application, but are not intended to limit this application. A person skilled in the art understands that this application may have various modifications and variations. Any modification, equivalent replacement, improvement, and the like made without departing from the spirit and principles of this application fall within the protection scope of this application.

What is claimed is:

1. A battery module, comprising:
a plurality of batteries, arranged sequentially along a thickness direction of the battery module;
side plates, disposed on two opposite ends of the plurality of batteries in a width direction of the battery module; and
a composite pad, disposed between two corresponding adjacent batteries along the thickness direction, wherein the composite pad comprises a cushion material sheet and a connecting strip disposed around the cushion material sheet, and a first bulge is disposed on the connecting strip;
wherein a first via hole is disposed on each side plate, and the first via hole corresponds to the first bulge; and
the first bulge is inserted into the first via hole so that the connecting strip is fixedly connected to the side plate; and wherein
the composite pad further comprises an overlay film layer, laid on two sides of the cushion material sheet and the connecting strip in the thickness direction, and configured to connect the cushion material sheet and the connecting strip together and expose the first bulge.

2. The battery module according to claim 1, wherein
each side plate comprises a main body and an upper bending portion, the upper bending portion extends from an upper side of the main body toward the plurality of batteries along the width direction, the upper bending portion is located on an upper side of the plurality of batteries in a height direction of the battery module, and the first via hole is disposed on the upper bending portion; and
the connecting strip comprises an upper connecting strip, the upper connecting strip is located on an upper side of the cushion material sheet, and the first bulge is formed on the upper connecting strip.

3. The battery module according to claim 1, wherein
each side plate comprises a main body and a lower bending portion, the lower bending portion extends from a lower side of the main body toward the plurality of batteries along the width direction, the lower bending portion is located on a lower side of the plurality of batteries in a height direction of the battery module, and the first via hole is disposed on the lower bending portion; and
the connecting strip comprises a lower connecting strip, the lower connecting strip is located on a lower side of the cushion material sheet, and the first bulge is formed on the lower connecting strip.

4. The battery module according to claim 1, wherein
each side plate comprises a main body, and the first via hole is disposed on the main body; and
the connecting strip comprises a lateral connecting strip, the lateral connecting strip is located on a side of the cushion material sheet in the width direction, and the first bulge is formed on the lateral connecting strip.

5. The battery module according to claim 2, wherein
the connecting strip comprises a lower connecting strip, the lower connecting strip is located on a lower side of the cushion material sheet, and a second bulge is formed on the lower connecting strip;
the battery module further comprises a lower plate, disposed and fixed on a lower side of the plurality of batteries in the height direction; and a second via hole corresponding to the second bulge is disposed on the lower plate; and
the second bulge is inserted into the second via hole so that the lower connecting strip is fixedly connected to the lower plate.

6. The battery module according to claim 4, wherein
the connecting strip further comprises a lower connecting strip, the lower connecting strip is located on a lower side of the cushion material sheet and connected to the lateral connecting strip, and a second bulge is formed on the lower connecting strip;
the battery module further comprises a lower plate, disposed and fixed on a lower side of the plurality of batteries in the height direction; and a second via hole corresponding to the second bulge is disposed on the lower plate; and
the second bulge is inserted into the second via hole so that the lower connecting strip is fixedly connected to the lower plate.

7. The battery module according to claim 3, wherein
the connecting strip comprises an upper connecting strip, the upper connecting strip is located on an upper side of the cushion material sheet, and a third bulge is formed on the upper connecting strip;
the battery module further comprises a partition plate, the partition plate is located on an upper side of the plurality of batteries in the height direction, and a third via hole is disposed on the partition plate, and
the third bulge is inserted into the third via hole so that the upper connecting strip is fixedly connected to the partition plate.

8. The battery module according to claim 4, wherein
the connecting strip further comprises an upper connecting strip, the upper connecting strip is located on an upper side of the cushion material sheet and connected to the lateral connecting strip, and a third bulge is formed on the upper connecting strip;

the battery module further comprises a partition plate, the partition plate is located on an upper side of the plurality of batteries in the height direction, and a third via hole is disposed on the partition plate; and the third bulge is inserted into the third via hole so that the upper connecting strip is fixedly connected to the partition plate.

9. The battery module according to claim 5, wherein the composite pad further comprises an overlay film layer, laid on two sides of the cushion material sheet and the connecting strip in the thickness direction, and configured to connect the cushion material sheet and the connecting strip together and expose the first bulge and the second bulge.

10. The battery module according to claim 7, wherein the composite pad further comprises an overlay film layer, laid on two sides of the cushion material sheet and the connecting strip in the thickness direction, and configured to connect the cushion material sheet and the connecting strip together and expose the first bulge and the third bulge.

11. The battery module according to claim 2, wherein the composite pad further comprises an overlay film layer, laid on two sides of the cushion material sheet and the connecting strip in the thickness direction, and configured to connect the cushion material sheet and the connecting strip together and expose the first bulge.

12. The battery module according to claim 3, wherein the composite pad further comprises an overlay film layer, laid on two sides of the cushion material sheet and the connecting strip in the thickness direction, and configured to connect the cushion material sheet and the connecting strip together and expose the first bulge.

13. The batter module according to claim 4, wherein the composite pad further comprises an overlay film layer, laid on two sides of the cushion material sheet and the connecting strip in the thickness direction, and configured to connect the cushion material sheet and the connecting strip together and expose the first bulge.

14. The battery module according to claim 6, wherein the composite pad further comprises an overlay film layer, laid on two sides of the cushion material sheet and the connecting strip in the thickness direction, and configured to connect the cushion material sheet and the connecting strip together and expose the first bulge and the second bulge.

15. The battery module according to claim 8, wherein the composite pad further comprises an overlay film layer, laid on two sides of the cushion material sheet and the connecting strip in the thickness direction, and configured to connect the cushion material sheet and the connecting strip together and expose the first bulge and the third bulge.

\* \* \* \* \*